United States Patent
Le Bars et al.

(10) Patent No.: US 8,154,208 B2
(45) Date of Patent: Apr. 10, 2012

(54) METHOD OF SUPPLYING POWER TO AN AUTOMOBILE HEADLIGHT LAMP AND HEADLIGHT USING THAT METHOD

(75) Inventors: Jean-François Le Bars, Elchingen (DE); Etienne Pauty, Paris (FR)

(73) Assignee: Valeo Vision, Bobigny (FR)

( * ) Notice: Subject to any disclaimer, the term of this patent is extended or adjusted under 35 U.S.C. 154(b) by 374 days.

(21) Appl. No.: 12/389,532

(22) Filed: Feb. 20, 2009

(65) Prior Publication Data

US 2009/0212705 A1 Aug. 27, 2009

(30) Foreign Application Priority Data

Feb. 22, 2008 (FR) ..................................... 08 00987

(51) Int. Cl.
*B60Q 1/02* (2006.01)

(52) U.S. Cl. ............ 315/82; 315/77; 315/291; 315/307; 362/464

(58) Field of Classification Search ............ 315/77, 315/82, 88, 89, 90, 92, 93, 119, 121, 127, 315/178, 182–183, 209 R, 224–226, 291, 315/294–295, 297, 299, 300, 306–308, 310, 315/311, 326, 342, 362
See application file for complete search history.

(56) References Cited

U.S. PATENT DOCUMENTS

| | | | | |
|---|---|---|---|---|
| 4,870,296 | A | * | 9/1989 | Nordeborn et al. .......... 307/10.8 |
| 5,997,162 | A | | 12/1999 | English et al. |
| 6,601,981 | B2 | * | 8/2003 | Wilski .......................... 362/510 |
| 6,914,385 | B2 | * | 7/2005 | Tamai et al. ..................... 315/77 |
| 2004/0113494 | A1 | * | 6/2004 | Karuppana et al. .......... 307/10.8 |
| 2004/0228137 | A1 | | 11/2004 | Mensales |
| 2006/0061301 | A1 | * | 3/2006 | Ito et al. ......................... 315/291 |
| 2006/0097765 | A1 | * | 5/2006 | Asada ............................. 327/172 |
| 2008/0106204 | A1 | * | 5/2008 | Sato et al. ........................ 315/77 |
| 2008/0122365 | A1 | * | 5/2008 | Decius et al. .................... 315/77 |
| 2009/0295294 | A1 | * | 12/2009 | Skene .............................. 315/77 |
| 2010/0045206 | A1 | * | 2/2010 | Chuang .......................... 315/294 |

FOREIGN PATENT DOCUMENTS

| | | |
|---|---|---|
| EP | 1177939 A | 2/2002 |
| EP | 1477732 A | 11/2004 |

* cited by examiner

*Primary Examiner* — Shawki S Ismail
*Assistant Examiner* — Jany Tran
(74) *Attorney, Agent, or Firm* — Jacox, Meckstroth & Jenkins

(57) ABSTRACT

A method and headlight adapted to supply power to a dual-mode automobile headlight light source able to provide either main beam mode lighting or dipped beam mode lighting, wherein the light source is supplied with electrical power at a first voltage when it is in main beam mode and at a second voltage when it is in dipped beam mode, the second voltage being lower than the first voltage.

20 Claims, 3 Drawing Sheets

|  | Luminous intensity at 12.8V | Luminous intensity at 13.2V | Service life at 13.2V | Luminous intensity at 11.78V | Service life at 11.78V |
|---|---|---|---|---|---|
| H7LL | 2 150 | 2 350 | 700 |  |  |
| H9 | 3 150 | 3 400 | 250 | 2 350 | 4,38 x 250 = 1 096 |

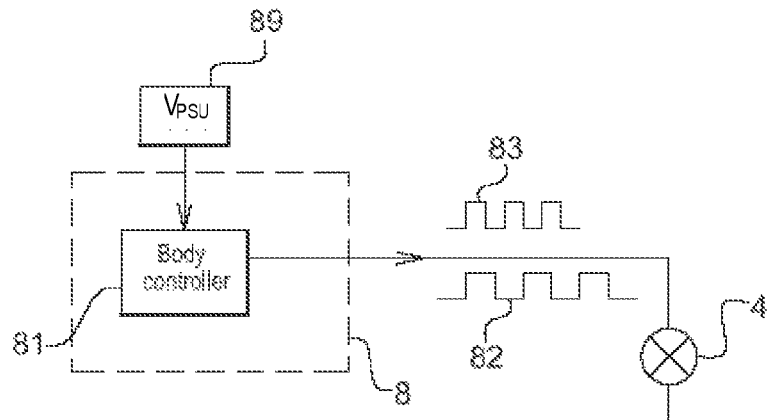
Fig. 3
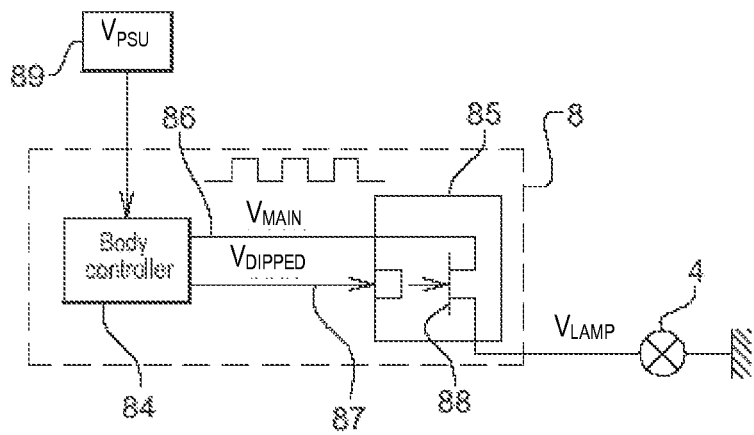
Fig. 4A
Fig. 4B

METHOD OF SUPPLYING POWER TO AN AUTOMOBILE HEADLIGHT LAMP AND HEADLIGHT USING THAT METHOD

CROSS-REFERENCE TO RELATED APPLICATIONS

This application claims priority to French Application No. 08 00 987 filed Feb. 22, 2008, which application is incorporated herein by reference and made a part hereof.

BACKGROUND OF THE INVENTION

1. Field of the Invention

The invention concerns a method for supplying electrical power to an automobile headlight lamp so that the lamp has both sufficient luminous intensity and a sufficient service life to be installed in an automobile vehicle. The invention also concerns an automobile vehicle headlight in which this method is used.

The invention finds applications in the field of automobile vehicle lighting and in particular in the field of supplying electrical power to lamps in vehicle headlights.

2. Description of the Related Art

In the field of automobile lighting, there exist various types of light projection devices, essentially including:
- side lights, of low intensity and range;
- dipped beam headlights of higher intensity and having a range of about 70 meters on the road, used essentially at night and where the distribution of the light beam is designed not to dazzle the driver of an oncoming vehicle;
- main beam headlights, with a long range of around 200 meters, which are used to illuminate the road far ahead and to enable the driver to see clearly where the vehicle is headed;
- fog lamps.

At present, there exist light projection devices, or headlights, which provide both the dipped beam headlight function and main beam headlight function. These headlights are called dual-function or dual-mode headlights. They alternate between dipped beam headlight mode and main beam headlight mode. This kind of dual-function headlight has a light source emitting exactly the same light in both modes of operation (dipped beam or main beam). It generally includes a removable cap adapted to intercept the light beam. For example, this cap is a metal shutter that can assume either a first position or a second position. In the first position, the cap does not block the light beam produced by the light source, or lamp, of the headlight. In the second position, the cap partially blocks the light beam produced by the lamp of the headlight. In this second position, the cap produces what is referred to as a specific cut-off of the light beam, and this specific cut-off corresponds to the cut-off of the light beam necessary to obtain the dipped beam function. Thus the dipped beam mode and the main beam mode differ in the presence or absence of the cut-off.

In most dual-function headlights, the removable cap pivots. It can thus assume the aforementioned two positions, namely:
- the second position, called the blocking position, in which it intercepts the light beam, thereby generating the dipped beam function, and
- the first position, called the neutral position, in which the cap does not block the light beam, thereby generating the main beam function.

FIG. 1 shows one example of an automobile vehicle headlight. This headlight 10 generally includes a casing 1 closed by a protective glass 2. The headlight 10 includes, inside the casing 1, a lighting module 3, for example an elliptical module. The lighting module 3 includes, in particular, a light source 4, also called a lamp, a reflector 5 adapted to reflect light toward the protective glass 2, a lens 6 adapted to diffuse the light, a removable cap 7 and power supply means 8 for the light source 4.

In present day dual-function headlights, the light source can be a halogen light source. This halogen light source is generally supplied with power at a fixed voltage, which depends on the light source used, the vehicle to which the light source is fitted and/or the country in which the vehicle is to be sold. This fixed voltage is generally the nominal voltage of the light source. A nominal voltage is specified by lamp manufacturers for each type of light source. This nominal voltage is the power supply voltage at which the light source functions optimally.

To enable the headlight to illuminate correctly the road in front of the vehicle, a light source must offer good performance, i.e. high power. The performance of a light source is characterized primarily by its luminous flux and its luminous intensity. Its performance, luminous flux and luminous intensity depend on the voltage at the terminals of the light source. The higher the voltage at the terminals of the light source, the higher the luminous flux and the luminous intensity. For example, considering the luminous intensity: for a standard H9 type lamp, the luminous intensity is of the order of 3400 $cd/cm^2$ for a nominal voltage at the terminals of the lamp of 13.2 Volts and 3150 $cd/cm^2$ for a voltage of 12.8 Volts.

Now, the person skilled in the art knows that the higher the voltage at the terminals of the lamp, the shorter the service life of the lamp. In other words, increasing luminous intensity is achieved to the detriment of the service life of the lamp. For example, with a voltage of 11.78 Volts, an H9 lamp has a service life approximately 4.4 times greater than that corresponding to its nominal voltage of 13.2 Volts, which in this case is of the order of 250 hours.

It is therefore difficult at present to arrive at a compromise between performance and service life. Automobile manufacturers must choose, for equipping a vehicle, between a lamp with a long service life and a lamp with a high luminous intensity. They must therefore choose between two lamp types:
- either a lamp offering a long service life, such as an H7 Long Life lamp, which offers moderate performance, with a luminous intensity of the order of 2350 $cd/cm^2$ and a long service life (of the order of 700 hours). This kind of lamp has the drawback of offering relatively low power illumination, essentially in the main beam mode where luminous intensity is very important, or
- a lamp offering very high performance, such as an H9 lamp, which offers very good luminous intensity (of the order of 3400 $cd/cm^2$) but a short service life (of the order of 250 hours). This type of lamp has the drawback that it must be changed frequently, which leads of course to an additional cost for the owner of the vehicle. The service life of this kind of lamp can be increased by reducing the voltage at the terminals of the lamp. With a power supply voltage of 11.78 Volts, for example, the service life of the lamp is approximately 1095 hours, although its luminous intensity falls to 2350 $cd/cm^2$, which corresponds to the luminous intensity of an H7 Long Life lamp. This kind of lamp with a reduced power supply voltage therefore offers the same performance in terms of power as an H7 Long Life lamp.

What is needed, therefore, is a system and method that overcomes one or more of the problems of the prior art.

SUMMARY OF THE INVENTION

To remove the drawbacks of the techniques described above, the invention proposes a method in which a different power supply voltage is applied to the terminals of the light source according to the operating mode of the headlight. To be more precise, when the headlight is in main beam mode, the light source is supplied with power at a voltage close to the nominal voltage of the light source and when the headlight is in dipped beam mode a voltage strictly lower than the nominal voltage is applied to the terminals of the light source.

To be more precise, the invention concerns a method of supplying power to a dual-mode automobile headlight light source able to provide either lighting in main beam mode or lighting in dipped beam mode, characterized in that the light source is supplied with electrical power at a first voltage when it is in main beam mode and at a second voltage when it is in dipped beam mode, the second voltage being lower than the first voltage.

Because the proportion of time for which a headlight operates in main beam mode is very much less than that for which it operates in dipped beam mode, on the one hand, the service life of the light source is increased compared to operation at the nominal voltage at all times and, on the other hand, the power of the light source in full beam mode is increased.

The method of the invention can have one or more of the following features:
 the first voltage has a value close to or equal to a nominal voltage of the light source.
 the second voltage is strictly less than the nominal voltage of the light source.
 the first and second voltages are pulse width modulated signals.
 the PWM signal corresponding to each voltage is controlled by a lighting controller.
 the PWM signal corresponding to each voltage is controlled by a regulation electronic circuit card located in the headlight.

The invention also concerns a headlight for automobile vehicles, including:
 a light source associated with a lighting module generating a light beam,
 a removable cap, and
 power supply means for supplying a voltage to the light source,
characterized in that the power supply means are adapted to generate alternately a first voltage when the headlight is in main beam mode and a second voltage, lower than the first voltage, when the headlight is in dipped beam mode.

The headlight of the invention can have one or more of the following features:
 the power supply means of the light source consist of a lighting controller.
 the power supply means of the light source include a lighting controller associated with a regulation electronic circuit card located in the headlight.
 the electronic circuit card includes an intelligent MOS component and/or other, identical components able to provide the voltage regulation function.
 the power supply means of the light source include a lighting controller associated with a regulation electronic circuit card located in the headlight, which card can be controlled by logic signals and/or messages in transit in digital form on a bus.
 the power supply means of the light source include a lighting controller associated with a regulation electronic circuit card located in the headlight, which card can be controlled by messages in transit in digital form on a bus allowing dynamic modification of the first and second voltages at the terminals of the light source depending on different mission profiles.

The invention further concerns an automobile vehicle that includes a headlight as described above.

These and other objects and advantages of the invention will be apparent from the following description, the accompanying drawings and the appended claims.

BRIEF DESCRIPTION OF THE ACCOMPANYING DRAWINGS

There follows a non-limiting description of the invention with reference to the following drawings:

FIG. 1, already described, is a diagram representing a standard automobile vehicle headlight;

FIG. 3 is a diagram representing first electrical power supply means for the light source of the invention; and FIGS. 4A, 4B, 4C and 4D are diagrams representing various electrical power supply means for the light source of the invention.

DETAILED DESCRIPTION OF THE PREFERRED EMBODIMENTS

Figures 1, 2:
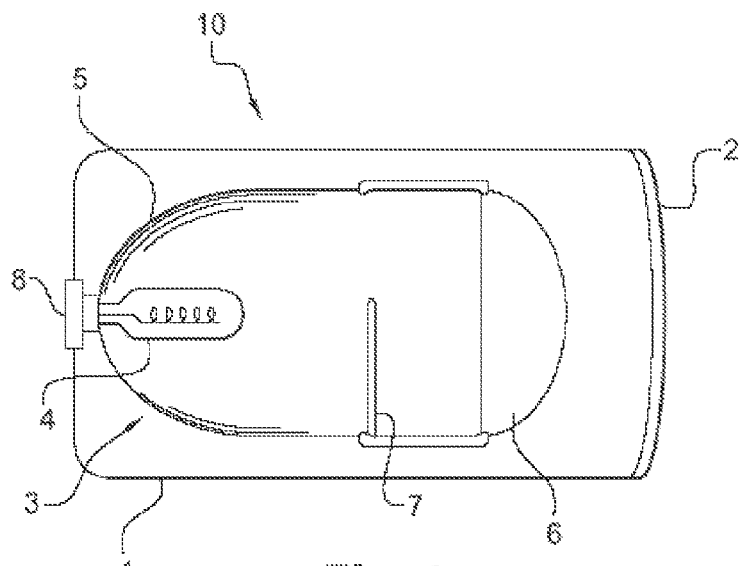
FIG. 2 represents a table grouping examples of luminous intensity and service life values for two types of light source.

The invention concerns a method for supplying power to the light source of an automobile vehicle headlight differently according to the mode of operation of the headlight. In particular, the invention proposes to supply the light source with power at a voltage whose value is close to the nominal voltage indicated by the manufacturer of the light source when the headlight is in full beam mode. This voltage can nevertheless be chosen to be different from the light source manufacturer's nominal voltage by automobile manufacturers depending on the performance and/or service life that they require for the illumination function. The invention further proposes to supply power to the light source at a voltage that is strictly less than the nominal voltage when the headlight is in dipped beam mode. Accordingly, with the invention, the main beam mode and the dipped beam mode differ, not only in the presence or absence of the cap, but also in the luminous intensity of the light beam emitted by the light source.

Hereinafter the expressions main beam mode and dipped beam mode of the headlight and main beam mode and dipped beam mode of the light source are used interchangeably, on the understanding that the light source is necessarily in the same mode as the headlight.

In the field of automobile lighting, it has been found that a headlight operates approximately 95% of the time in the dipped beam mode, i.e. in the mode in which the dipped beam headlights are on.

In dipped beam mode, it is necessary for the headlight to guarantee sufficient lighting to satisfy safety requirements and statutory provisions. The devices that exist at present and are regarded as dependable have been developed to obtain such performance over a long service life using H7 Long Life (H7LL) type lamps or performance and service life of the same order of magnitude.

The headlight operates only 5% of the time in main beam mode, i.e. in the mode in which the main beam headlights are on. Now, it is in main beam mode that it is necessary, for the driver, that the headlights provide powerful illumination, i.e. that the light sources offer high performance. Consequently, the light source is required to have a high luminous intensity for only 5% of its operating time.

Taking account of this fact, and the relationship explained above between the value of the voltage and the luminous intensity level of a light source, the invention proposes to supply power to the light source of the headlight at a voltage close to the nominal voltage for 5% of the time, in which it is operating in main beam mode, and to supply power to the light source at a reduced voltage during the 95% of the time for which the light source operates in dipped beam mode.

The nominal voltage is the voltage indicated by the manufacturer of the light source and considered to offer optimum operation of the light source. According to the invention, the voltage applied when the light source is in main beam mode can be the nominal voltage. This voltage can equally be a voltage significantly lower or higher than the nominal voltage. According to the invention, the voltage applied when the light source is in main beam mode is a voltage of sufficient value for the luminous intensity of the light source to achieve a level chosen by the automobile manufacturer. In the remainder of the description, the expression "nominal voltage" is to be understood as referring to a voltage near or equal to the nominal voltage.

FIG. 2 represents a table grouping examples of luminous intensity and service life for different types of lamps, at different voltage levels. This table shows in particular the luminous intensity and the service life of an H7LL lamp and an H9 lamp. With a voltage at the terminals of the lamp of 12.8 Volts, an H7LL lamp has a luminous intensity of 2150 cd/cm$^2$ and an H9 lamp has a luminous intensity of 3150 cd/cm$^2$. If the voltage rises to 13.2 Volts, the H7LL luminous intensity increases to 2350 cd/cm$^2$ and the H9 intensity increases to 3400 cd/cm$^2$. In this case, the H7LL service life is 700 hours and the H9 service life is 250 hours.

If the power supply voltage of the H9 lamp is reduced to 11.78 Volts, the H9 luminous intensity falls to 2350 cd/cm$^2$, which corresponds to the luminous intensity of an H7LL lamp supplied with power at 13.2 V. On the other hand, the H9 service life increases to 1095 hours, which is even slightly greater than the service life of an H7LL lamp. Clearly, then, with the method of the invention, the H9 lamp offers performance and a service life at least identical to those of an H7LL lamp when the lamp is in dipped beam mode, i.e. 95% of the time. On the other hand, the H9 lamp retains its initial performance, i.e. a high performance, when it is in main beam mode, i.e. 5% of the time. Clearly, the service life of an H9 lamp is significantly increased over the entire operating time of the lamp, i.e. 100% of the time.

In the foregoing description, the power supply voltage of 11.78 Volts corresponds to the preferred embodiment of the invention. This power supply voltage has been determined to obtain with a downrated H9 lamp (i.e. one receiving at its terminals a reduced power supply voltage) the same luminous intensity as an H7LL lamp at 13.2 V. In the field of automobile lighting, it is known that the performance of the lamp varies with the voltage at its terminals raised to the power 3.25. The H9 reduced voltage V has therefore been determined from the luminous intensity and the voltage at the H7LL terminals, as follows:

$$\left(\frac{V}{13.2}\right)^{3.25} = \frac{2350}{3400}$$

whence $$3.25 \, Ln\frac{V}{13.2} = Ln\frac{2350}{3400}$$

$$Ln\frac{V}{13.2} = \frac{1}{3.25} \times Ln\frac{2350}{3400}$$

$$\frac{V}{13.2} = e^{\frac{1}{3.25} \times Ln\frac{2350}{3400}}$$

$$V = 13.2 \times e^{\frac{1}{3.25} \times Ln\frac{2350}{3400}}$$

$$V = 11.78$$

Furthermore, it is known that the service life of the lamp varies depending on the voltage at its terminals raised to the power 13. The service life D of the H9 lamp using the method of the invention can therefore be determined:

$$D = \left(\frac{13.2}{11.78}\right)^{13}$$
$$= 4.38 \, l$$

In the case of an H9 lamp, for a nominal voltage of 13.2 V, the service life is as follows:
- an H9 lamp lasts 250 hours at 13.2 V,
- an H9 lamp operates 5% of the time at 13.2 V,
- There therefore remain 250-5%=250-12.5=237.5 hours of operation at the nominal voltage,
- Which is equivalent to 237.5×4.38≈1040 hours at reduced voltage.

The H9 lamp therefore has a total service life of 1040+12.5=1052.5 hours with performance increased by a factor of approximately 1.4 compared to a standard halogen lamp such as an H7LL lamp.

With this kind of method of supplying power to a H9 lamp, it is possible to obtain a headlight offering a maximum illumination of the order of 80 Lux for the main beams and of the order of 45 Lux for the dipped beams.

The method of the invention that has just been described can be implemented in an automobile vehicle headlight such as that shown in FIG. 1. According to the invention, the power supply means 8 are adapted to supply either a nominal voltage of the light source or a reduced voltage, depending on the mode of operation of the headlight (dipped beam mode or main beam mode). In particular, the power supply means 8 are adapted to provide a first voltage close to or equal to the nominal voltage of the light source when the light source is in main beam mode and to provide a reduced voltage, with a value predefined by the automobile manufacturer, when the light source is in dipped beam mode.

For this, the power supply means 8 of the headlight can consist of a lighting controller that is located externally of the headlight and can where appropriate be integrated into another electronic unit such as the body controller to control the power of the lamps of the vehicle. The light source is then supplied with power directly by the lighting controller of the vehicle, using a pulse width modulation (PWM) signal. In dipped beam mode, the lighting controller supplies power to the light source using a PWM signal for regulating the average voltage at the terminals of the light source to the value of the predefined reduced voltage, for example 11.78 V. In main beam mode, the lighting controller supplies power to the light source using a PWM signal for regulating the average voltage at the terminals of the light source to the value of the nominal voltage, for example 13.2 V. The PWM signal is a binary signal which can be either at 1, which signifies that 100% of the current is flowing, or at 0, which signifies that 0% of the current is flowing.

FIG. 3 represents an example of an electronic circuit corresponding to the first embodiment of the power supply means 8. In this figure, the power supply means 8 consist of a lighting controller 81 that generates a first signal 82 ($PWM_R$) and a second signal 83 ($PWM_C$) addressed to the light source 4. The first signal 82 has a first pulse width corresponding to the voltage close to the nominal voltage. This first signal 82 is generated when the headlight is in main beam mode. Alternatively, the lighting controller 81 generates a second signal 83 having a second pulse width corresponding to the reduced voltage. This second signal 83 is generated when the headlight is in dipped beam mode.

Accordingly, in main beam mode, the light source 4 is supplied with power at the power supply voltage $V_{PSU}$ of the lighting controller pulse width modulated with the ratio $PWM_R$ (when the factor $PWM_R$ is equal to 1, the light source is supplied with power directly at the voltage $V_{PSU}$ (89)). In dipped beam mode, the light source 4 is supplied with power at the power supply voltage $V_{PSU}$ of the lighting controller pulse width modulated with the ratio $PWM_C$. The duty cycle of the signal $PWM_R$ is higher than that of the signal $PWM_C$, in other words: rms voltage ($PWM_R$)>rms voltage ($PWM_C$).

Automobile manufacturers can then choose the values of the voltages that they wish to regulate depending on the mission profile of the vehicle. Manufacturers can then decide to supply the lamps of the vehicles differently according to the country and to requirements in terms of service life and/or luminous intensity. In this embodiment, the voltage values are programmed directly into the software of the lighting controller.

In a second embodiment of the headlight, the voltage is regulated by an electronic circuit card in the light source that regulates the PWM signal. This card, located in the headlight, can be separate from or be part of an intelligent lighting controller internal to the headlight if other functions are required (for example for lighting in daylight and/or turn indicators using LEDs or for "swiveling headlight" devices).

In FIG. 4A there is represented a first example of an electronic circuit corresponding to the second embodiment of the power supply means 8. In this FIG. 4A, the power supply means 8 include a lighting controller 84 external to the headlight that generates a first signal $V_{MAIN}$ (86) and a second signal $V_{DIPPED}$ (87). The signal $V_{MAIN}$ is obtained directly from the voltage $V_{PSU}$ modulated by the PWM signal (the PWM ratio can where appropriate be equal to 1), and the signal $V_{DIPPED}$ is a binary signal that can take the value 0 or 1.

The signals $V_{MAIN}$ and $V_{DIPPED}$ are sent to the electronic circuit card 85. This electronic circuit card 85 is located in the headlight. This electronic circuit card 85 includes, in particular, an intelligent MOS component, for example a Smart MOS 88, having the particular feature of chopping the current that circulates in the light source to provide a PWM signal.

The FIG. 4B table groups together the various situations that can arise depending on the values $V_{MAIN}$ and $V_{DIPPED}$. In main beam mode, i.e. when the signal $V_{DIPPED}$ is at 0, two situations are possible:

either the circuit allows all of the supply voltage $V_{PSU}$ 89 to enter the light source 4, which is equivalent to a PWM signal at 1; the voltage $V_{LAMP}$ at the terminals of the light source 4 is then equal to $V_{PSU}$;

or the circuit performs intrinsic regulation that modulates the supply current to a predefined PWM ratio $PWM_R$; the voltage $V_{LAMP}$ at the terminals of the light source 4 is then equal to $V_{PWM_R}$.

In dipped beam mode, the signal $V_{DIPPED}$ is at 1. The circuit can then function in the following two ways:

when $PWM_R$ is at 1, the circuit generates a fixed PWM signal that modulates the current of the light source; the voltage $V_{LAMP}$ at the terminals of the light source 4 is then equal to the voltage $V_{PWM_C}$ of the signal $PWM_C$;

when $PWM_R$ is not equal to 1, the circuit generates a PWM signal that is synchronized to one of the flanks of the modulated power supply signal and generates a signal with a different PWM ratio that lowers the rms voltage at the terminals of the light source; the voltage $V_{LAMP}$ at the terminals of the light source 4 is then equal to the voltage $V_{PWM_C}$ of the signal $PWM_C$.

In this second embodiment, as before, automobile manufacturers can choose the values of the voltages that they want to regulate depending on the mission profile of the vehicle. On the other hand, in this embodiment, the values of the voltages must be specified when installing the electronic circuit card.

In a third embodiment, instructions relating to the dipped beam and main beam operating modes can be sent in the form of binary messages 0 or 1 (in this case there are two control inputs) in the form of messages in transit on a bus, for example using the LIN or the CAN protocol.

In this case, the electronic circuit card 90 in the headlight 10 includes a logic device 91, for example a microcontroller-based device, capable of decrypting the messages and controlling accordingly the portion relating to the PWM control of the light source.

Figure 4C:
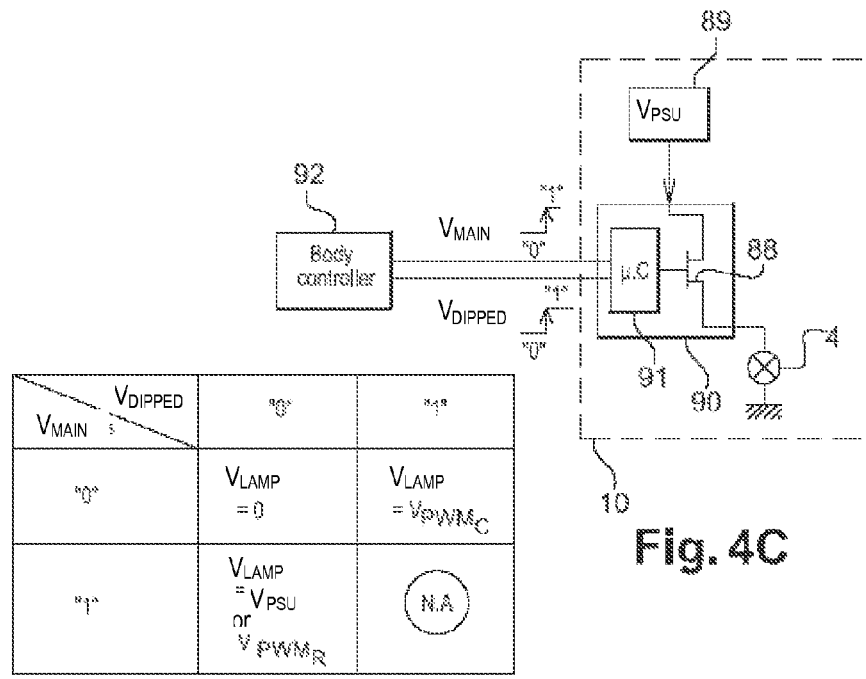

In FIG. 4C, the signals $V_{DIPPED}$ and $V_{MAIN}$ from the lighting controller 92 external to the headlight are binary signals; the control logic of the light source is defined in the FIG. 4C table:

$V_{MAIN}$=0, $V_{DIPPED}$=0–no current flows in the light source
$V_{MAIN}$=1, $V_{DIPPED}$=1–no current flows in the light source
$V_{MAIN}$=1, $V_{DIPPED}$=0–main beam mode
  either the circuit allows all of the supply current $V_{PSU}$ 89 to enter the light source 4, which is equivalent to a PWM signal at 1; the voltage $V_{LAMP}$ at the terminals of the light source 4 is then equal to $V_{PSU}$;
  or the circuit performs intrinsic regulation that modulates the supply current at a predefined PWM ratio $PWM_R$; the voltage $V_{LAMP}$ at the terminals of the light source 4 is then equal to $V_{PWMR}$
$V_{MAIN}$=0, $V_{DIPPED}$=1–dipped beam mode
  The circuit can then function in the following two ways:
  when $PWM_R$ is at 1, the circuit generates a fixed PWM signal that modulates the current of the light source; the voltage $V_{LAMP}$ at the terminals of the light source 4 is then equal to the voltage $V_{PWM_C}$ of the signal $PWM_C$;
  when $PWM_R$ is not equal to 1, the circuit generates a PWM signal that is synchronized to one of the flanks of the modulated power supply signal and generates a signal with a different PWM ratio that lowers the rms voltage at the terminals of the light source; the voltage $V_{LAMP}$ at the terminals of the light source 4 is then equal to the voltage $V_{PWM_C}$ of the signal $PWM_C$.

As before in this third embodiment, automobile manufacturers can choose the values of the voltages that they want to regulate depending on the mission profile of the vehicle. In this embodiment, the values of the voltages must also be specified when installing the electronic circuit card.

In a fourth embodiment, instructions relating to the dipped beam and main beam modes of operation can be sent in the form of messages in transit on a bus 96, for example using the LIN or the CAN protocol.

The electronic circuit card 93 in the headlight 10 then includes a logic device 95, often microcontroller-based, able to decrypt the messages and control accordingly the portion relating to PWM control of the light source.

Figure 4D:
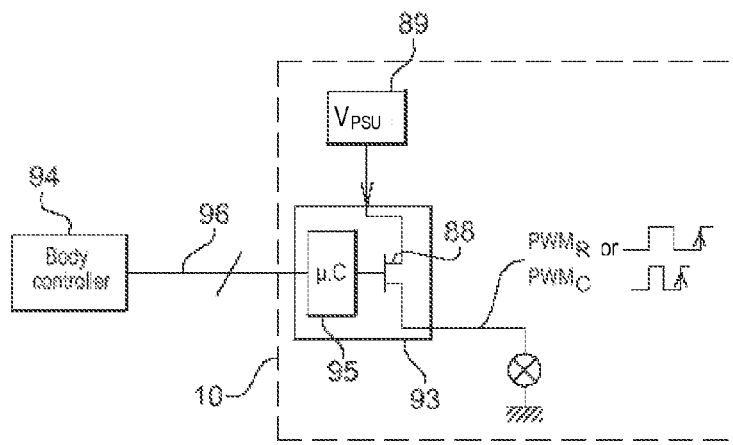

In FIG. 4D, the dipped beam and main beam signals coming from the lighting controller are messages coded under the protocol imposed by the manufacturer. Programming the microcontroller 95 associated with the control electronics of the card enables the lamps to be controlled in the dipped beam and main beam modes with the appropriate factors $PWM_r$ and $PWM_c$.

In this embodiment, the values of the voltages (the values of the PWM ratios) can vary and be controlled according to what is required directly by the body controller depending on the profile that the manufacturer wants.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A power supply method of supplying power to a dual-mode automobile headlight light source able to provide either lighting in a main beam mode or lighting in a dipped beam mode, wherein said method comprises the step of:
   supplying the light source with electrical power at a first voltage when it is in main beam mode during which said light source emits a main beam of a first intensity;
   supplying said light source with at a second voltage when it is in dipped beam mode during which said light beam emits a second beam of a lower intensity, the second voltage being lower than the first voltage; and
   activating a cap or shutter to cause a cut-off of the second beam, thereby providing a dipped beam from said second beam.

2. The power supply method according to claim 1, wherein said first voltage has a value close to or equal to a nominal voltage of said light source.

3. The power supply method according to claim 2, wherein said second voltage is strictly less than the nominal voltage said light source.

4. The power supply method according to claim 3, wherein said first and second voltages are pulse width modulated (PWM) signals.

5. The power supply method according to claim 1, wherein said first and second voltages are pulse width modulated (PWM) signals.

6. The power supply method according to claim 5, wherein said PWM signal corresponding to each voltage is controlled by a lighting controller.

7. The power supply method according to claim 5, wherein said PWM signal corresponding to each voltage is controlled by a regulation electronic circuit card located in the headlight.

8. The power supply method according to claim 2, wherein said first and second voltages are pulse width modulated (PWM) signals.

9. A headlight for automobile vehicles comprising:
   a light source associated with a lighting module generating a light beam,
   a removable cap, and
   power supply means for supplying a voltage to the light source, wherein the power supply means are adapted to generate alternately a first voltage when the headlight is in a main beam mode during which said light source emits a main beam of a first intensity and a second voltage, lower than the first voltage, when the headlight is in a dipped beam mode during which said light beam emits a second beam of a lower intensity;
   wherein said removable cap is adapted to be movable between a first position where said removable cap does not block said main beam or a second position wherein said removable cap partially blocks said second beam to produce a dipped beam.

10. The headlight according to claim 9, wherein said power supply means of said light source comprises a lighting controller.

11. An automobile vehicle, wherein said automobile vehicle includes a headlight according to claim 10.

12. The headlight according to claim 9, wherein said power supply means of said light source include a lighting controller associated with a regulation electronic circuit card located in said headlight.

13. The headlight according to claim 12, wherein said regulation electronic circuit card includes an intelligent MOS component.

14. An automobile vehicle, wherein said automobile vehicle includes a headlight according to claim 13.

15. An automobile vehicle, wherein said automobile vehicle includes a headlight according to claim 12.

16. The headlight according to claim 9, wherein said power supply means of said light source include a lighting controller associated with a regulation electronic circuit card located in said headlight, which card can be controlled by logic signals and/or messages in transit in digital form on a bus.

17. The headlight according to claim 16, wherein said power supply means of the light source include a lighting controller associated with a regulation electronic circuit card located in the headlight, which card can be controlled by messages in transit in digital form on a bus allowing dynamic modification of said first and second voltages at the terminals of the light source depending on different mission profiles.

18. An automobile vehicle, wherein said automobile vehicle includes a headlight according to claim 16.

19. The headlight according to claim 9, wherein said power supply means of said light source include a lighting controller associated with a regulation electronic circuit card located in the headlight, which card can be controlled by messages in transit in digital form on a bus allowing dynamic modification of said first and second voltages at the terminals of said light source depending on different mission profiles.

20. An automobile vehicle, wherein said automobile vehicle includes a headlight according to claim 9.

* * * * *